United States Patent
Dimov et al.

(10) Patent No.: US 10,473,938 B2
(45) Date of Patent: Nov. 12, 2019

(54) MULTI-PART OPTICAL SYSTEM FOR LIGHT PROPAGATION IN CONFINED SPACES AND METHOD OF FABRICATION AND USE THEREOF

(71) Applicant: LUMINIT LLC, Torrance, CA (US)

(72) Inventors: Fedor Dimov, Redondo Beach, CA (US); Neven Rakuljic, Santa Ana, CA (US); Seth Coe-Sullivan, Redondo Beach, CA (US)

(73) Assignee: LUMINIT LLC, Torrance, CA (US)

( * ) Notice: Subject to any disclaimer, the term of this patent is extended or adjusted under 35 U.S.C. 154(b) by 0 days.

(21) Appl. No.: 15/858,379

(22) Filed: Dec. 29, 2017

(65) Prior Publication Data

US 2018/0188541 A1    Jul. 5, 2018

Related U.S. Application Data

(60) Provisional application No. 62/440,894, filed on Dec. 30, 2016.

(51) Int. Cl.
*G03H 1/00* (2006.01)
*G02B 27/01* (2006.01)
*G02B 3/08* (2006.01)

(52) U.S. Cl.
CPC ............ *G02B 27/0172* (2013.01); *G02B 3/08* (2013.01); *G02B 2027/0174* (2013.01)

(58) Field of Classification Search
CPC ............ G02B 27/0172; G02B 27/0103; G02B 2027/0174; G02B 2027/0178
USPC ...................................................... 359/13, 14
See application file for complete search history.

(56) References Cited

U.S. PATENT DOCUMENTS

| | | | |
|---|---|---|---|
| 9,958,682 B1* | 5/2018 | Moore | G02B 27/0172 |
| 9,977,248 B1* | 5/2018 | Xie | G09G 5/00 |
| 10,031,338 B2* | 7/2018 | Alexander | G03H 1/2645 |
| 10,089,516 B2* | 10/2018 | Popovich | G02B 26/0808 |
| 10,145,533 B2* | 12/2018 | Popovich | G02B 5/32 |
| 10,156,681 B2* | 12/2018 | Waldern | G02B 5/32 |
| 10,156,725 B2* | 12/2018 | TeKolste | G02B 27/0172 |
| 10,185,154 B2* | 1/2019 | Popovich | G02B 27/48 |
| 10,185,393 B2* | 1/2019 | Sulai | G06F 3/013 |
| 2017/0176745 A1* | 6/2017 | Poon | G02B 27/0172 |
| 2017/0299869 A1* | 10/2017 | Urey | A61B 3/032 |
| 2017/0307886 A1* | 10/2017 | Stenberg | G02B 5/1814 |
| 2017/0307887 A1* | 10/2017 | Stenberg | G02B 5/1823 |
| 2017/0315356 A1* | 11/2017 | Tervo | G02B 6/0076 |
| 2017/0322426 A1* | 11/2017 | Tervo | G02B 6/124 |
| 2017/0357090 A1* | 12/2017 | Martinez | G02B 27/01 |
| 2018/0011324 A1* | 1/2018 | Popovich | G02B 6/003 |
| 2018/0045949 A1* | 2/2018 | Hua | G02B 5/04 |
| 2018/0059305 A1* | 3/2018 | Popovich | G02B 6/0016 |
| 2018/0103841 A1* | 4/2018 | Sprowl | A61B 3/0285 |

(Continued)

*Primary Examiner* — William R Alexander
*Assistant Examiner* — Tamara Y. Washington
(74) *Attorney, Agent, or Firm* — Lathrop Gage LLP

(57) ABSTRACT

The present invention is a Substrate guided hologram that allows a wider range of optical devices based on SGHs with improved parameters such as larger NTE displays with a wider field of view, thinner substrates and more compact form factors. The Substrate-Guided Hologram of the subject invention includes a holographic lens which is positioned at an angle to and spaced from a holographic grating, with a mirror located at a diagonal to each of the lens and the grating.

15 Claims, 1 Drawing Sheet

(56) References Cited

U.S. PATENT DOCUMENTS

| | | | |
|---|---|---|---|
| 2018/0143682 A1* | 5/2018 | Larson | G02B 27/0172 |
| 2018/0164583 A1* | 6/2018 | Wall | G02B 27/0018 |
| 2018/0188541 A1* | 7/2018 | Dimov | G02B 27/0172 |
| 2018/0188542 A1* | 7/2018 | Waldern | G02B 27/0172 |
| 2018/0203229 A1* | 7/2018 | Lu | G02B 27/0172 |
| 2018/0232048 A1* | 8/2018 | Popovich | A61B 3/113 |
| 2018/0252857 A1* | 9/2018 | Glik | G02B 6/0016 |
| 2018/0275402 A1* | 9/2018 | Popovich | G02B 27/0103 |
| 2018/0284439 A1* | 10/2018 | Vallius | G02B 27/0172 |
| 2018/0284440 A1* | 10/2018 | Popovich | G02B 27/0179 |
| 2018/0348429 A1* | 12/2018 | Young | G02B 6/1223 |
| 2018/0348522 A1* | 12/2018 | Young | G02B 27/0172 |
| 2019/0004219 A1* | 1/2019 | Tervo | G02B 5/1842 |
| 2019/0004325 A1* | 1/2019 | Connor | G02B 27/2278 |

* cited by examiner

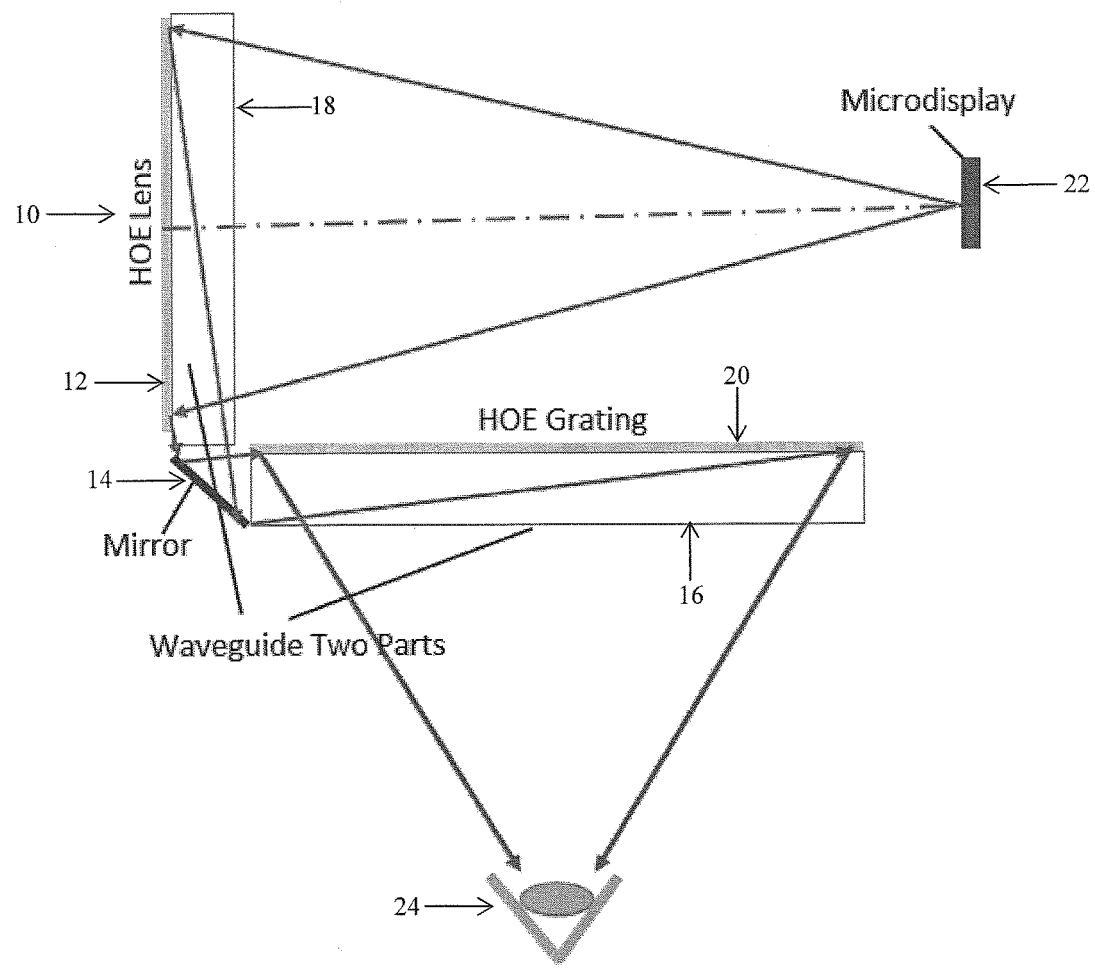

MULTI-PART OPTICAL SYSTEM FOR LIGHT PROPAGATION IN CONFINED SPACES AND METHOD OF FABRICATION AND USE THEREOF

BACKGROUND

Field of the Invention

The present Invention relates to optics, and more particularly, it relates to optical waveguides and substrate-guided holograms.

Substrate guided wave (SGW) holography is accomplished by recording and reconstructing holographic images with light beams guided by an optical substrate. An object wavefront guided or propagated in free space can be holographically recorded using a light beam transmitted through a substrate of transparent dielectric material with two parallel surfaces. The light beam is confined within the substrate by total internal reflection and propagates through the substrate to holographic material where it overlaps with another guided or non-guided beam, creating an interference pattern. When the hologram is processed and illuminated, the holographic wavefront may be reconstructed.

The use of Substrate-Guided Holograms (SGHs) provides numerous advantages, such as providing compact solution for near-to-eye (NTE) displays, allowing fully see through displays, avoiding stray light, and providing user privacy to the displayed information.

SUMMARY OF THE INVENTION

In one embodiment, the present invention is a Substrate guided hologram that will allow the construction of a wider range of optical devices based on SGHs with improved parameters such as larger NTE displays with a wider field of view, thinner substrates and more compact form factors. The Substrate-Guided Hologram of the subject invention includes a holographic lens which is positioned at an angle to and spaced from a holographic grating, with a mirror located at a diagonal to each of the lens and the grating. A microdisplay is spaced from the lens at the lens' focal distance or closer to create a collimated type of Near to Eye (NTE), display with the virtual image seen at infinite or closer at a predetermined distance. The NTE is generally a virtual display mounted on a helmet with the projection lenses placed at a close distance in front of one or both of the user's eyes. The lens and grating are on first and second physically separate substrates. A light beam with the image travels from the microdisplay through the lens into the first substrate where it diffracts at a shallow angle to travel by total internal reflection through the substrate and bounces off the mirror into the second substrate where it is diffracted by the grating the viewer.

In another embodiment, the invention comprises an optical system with a light source bearing an image; there is a holographic lens adjacent a first substrate and a holographic grating adjacent a second substrate, whereby the holographic lens is positioned perpendicular and spaced from the holographic grating. A mirror is between the holographic lens and the holographic grating so that a light beam with the image travels from the light source through the first substrate to the holographic lens and through the first substrate by total internal reflection to bounce off the mirror into the second substrate to the holographic grating by total internal reflection and is then out-coupled for viewing by a user. The first substrate can have a different refractive index from the second substrate. The first substrate can have a larger refractive index than the holographic lens. The second substrate can have a smaller index of refraction than the holographic grating. Differences in the refractive indexes of the two substrate provide more flexibility for the NTE display geometries in the terms of guided angles, substrates, thicknesses and accordingly for the weight and volume of the displays.

BRIEF DESCRIPTION OF THE DRAWING

FIG. 1 is a schematic of the present invention.

DETAILED DESCRIPTION OF THE DRAWING

The subject invention involves a bent waveguide, which includes two straight portions for directing a light beam connected by a portion which changes the direction of the light beam.

A holographic optical element (HOE) lens 10 and HOE grating 20 reside on physically separated substrates 18 and 16, respectively. These substrates can be manufactured from materials with different refractive indices, giving more flexibility in choosing guided angles (angles between the hologram surface and the beam direction) than in prior art systems. The lens 10 and substrate 18, can be positioned at right angles and spaced from the grating 20 and substrate 16. The respective substrates may be positioned at any desired angle, however, from 0° to 360°, preferably 45° to 135°, and most preferably 90°. A mirror 14 is positioned at an angle adjacent lens 10 and substrate 18 on the one hand, and grating 20 and substrate 16 on the other. The substrates 16 and 18 may be spaced 5-10 mm from each other, but the spacing is not critical, needing only to be as small as possible to maximize the eye box and minimize the distance subtracted from the eye relief There should, however, be enough room to include the mirror.

In one embodiment of the present invention, when a guided beam is propagating from the HOE lens 12 in the substrate 18, it is more advantageous to have a larger refractive index in the substrate than in the lens 12 (e.g., it can be a paired HOE with n=1.49 and polycarbonate substrate with n=1.56). When the beam is propagating from the substrate 16 in the grating 20, the substrate 16 should have a smaller index of refraction than the grating 20 (e.g., it can be a paired HOE grating with n=1.49 and silica glass with n=1.46, or plastic with a smaller index of refraction than the HOE grating 20).

Both substrates 16 and 18 are generally substantially transparent in at least a portion thereof, but may be also entirely transparent. The substrates can be made from a number of materials. For example, they can be made of at least glass, polycarbonate plastic, acrylic plastic, polyolefin resin, or any other plastic used in the art. Such a substrate is at least operative when having a thickness of the 0.3-6 mm, but can also be operative at other thicknesses.

The substrates 16 and 18 are depicted in the figures as a single, unitary body of a single material. However, the substrates may also comprise a plurality of bodies made of a single layer or a plurality of laminations. A person of ordinary skill in the art will be capable of using ray-tracing software to determine whether the particular configuration of materials and bodies will serve to transmit the light in-coupled through the first substrate 18, and out-coupled to the second substrate 16.

The in-coupled light is first transmitted through the substrate 18 through total internal reflection. The substrate 18 must have an index of refraction, relative to the environmental medium, sufficient to internally reflect the light. For example, in space, the index of refraction is very close to 1; in air the index of refraction is about 1.00025 to 1.00030. Those of ordinary skill in the art will be able to calculate an angle of total internal reflection. Examples of high-index of refraction materials capable of total internal reflection with many media are polycarbonate plastic and acrylic plastic.

Transparent means that the substrates 16 and 18 are capable of permitting light through to allow the light out-coupling. Accordingly, the substrate may be color tinted or have other modifications that do not render the device inoperative. For example, any material will have some amount of diffusion from imperfections or inclusions, but the diffusion should not be so great as to prevent the acceptance, conveyance, and transmission of the light by the second substrate.

The substrate 16 and 18 can be made of a bendable (flexible) material thus capable of providing backlight for a flexible type LCD. Flexible LCDs are known to those skilled in the art as capable of changing their shape upon application of the mechanical bend, twist, or splay force, without any degradation in the image quality or mechanical wholeness of the device.

It will be understood that the foregoing description is of preferred exemplary embodiments of the invention and that the invention is not limited to the specific forms shown or described herein. Various modifications may be made in the design, arrangement, and type of elements disclosed herein, as well as the steps of making and using the invention without departing from the scope of the invention as expressed in the appended claims.

We claim:

1. A substrate guided holographic system for a near to eye device comprising:
    a light source bearing an image from a microdisplay;
    a holographic lens fixed to a first transparent substrate, said holographic lens and said first transparent substrate disposed in a first plane;
    a holographic grating fixed to a second transparent substrate, said holographic grating and said first transparent substrate disposed in the first plane;
    said second transparent substrate being spaced from and at an angle of 45° to 135° to said first transparent substrate;
    said first substrate having a refractive index different from said second substrate;
    the holographic lens spaced from 5 mm to 10 mm from the holographic grating and at an angle of 45° to 135° to each other; and
    a mirror disposed in the first plane, the mirror separate from and between said first transparent substrate and said second transparent substrate and at an angle between the holographic lens and the holographic grating whereby a light beam with the image travels from the light source through the first substrate to the holographic lens then through the first substrate by total internal reflection to bounce off the mirror into the second substrate to the holographic grating by total internal reflection and then out-coupled for viewing by a user.

2. The optical system of claim 1 wherein the first substrate has a different refractive index from the second substrate.

3. The optical system of claim 1 wherein the first substrate has a larger refractive index than the holographic lens.

4. The optical system claim 1 wherein the second substrate has a smaller index of refraction than the holographic grating.

5. The substrate guided holographic system of claim 1 wherein said light beam is reflected from said holographic lens a single time.

6. The substrate guided holographic system of claim 5 wherein said light beam is reflected from said holographic grating a single time.

7. The substrate guided holographic system of claim 6 wherein said light beam is reflected from said mirror a single time.

8. An optical system comprising:
    a light source bearing an image;
    a holographic lens fixed to a first substrate and defining a first plane therebetween;
    a holographic grating fixed to a second substrate and defining a second plane therebetween, said second plane being positioned at an angle of 45° to 135° to said first plane;
    said first substrate being spaced from and having a refractive index different from said second substrate;
    said first and second substrates being in a third plane, said first and second substrates intersecting the first and second planes;
    the holographic lens spaced from the holographic grating; and
    a mirror being in the third plane, the mirror separate from and between the first and second substrates and between the holographic lens and the holographic grating whereby a light beam with the image travels from the light source through the first substrate to the holographic lens then through the first substrate by total internal reflection to bounce off the mirror into the second substrate to the holographic grating by total internal reflection and then out-coupled for viewing by a user.

9. The optical system of claim 8 wherein said light beam is reflected from said holographic lens a single time.

10. The optical system of claim 9 wherein said light beam is reflected from said holographic grating a single time.

11. The optical system of claim 10 wherein said light beam is reflected from said mirror a single time.

12. An optical system comprising:
    a light source bearing an image from a microdisplay;
    a holographic lens fixed to a first transparent substrate;
    a holographic grating fixed to a second transparent substrate;
    said second transparent substrate spaced from and at an angle of 45° to 135° to said first transparent substrate;
    said first substrate having a refractive index different from said second substrate;
    said holographic lens spaced from 5 mm to 10 mm from said holographic grating and at an angle of 45° to 135° to each other; and
    a mirror separate from said first transparent substrate and said second transparent substrate, said mirror having:
        a first end at an angle adjacent said holographic lens and said first substrate; and
        an opposed second end at an angle adjacent said holographic grating and said second substrate;
    wherein a light beam with said image travels from said light source through said first substrate to said holographic lens then through said first substrate by total internal reflection to bounce off said mirror into said second substrate to said holographic grating by total internal reflection and then out-coupled for viewing by a user, the light beam being confined to a single plane.

13. The optical system of claim 12 wherein said light beam is reflected from said holographic lens a single time.

14. The optical system of claim 13 wherein said light beam is reflected from said holographic grating a single time.

15. The optical system of claim 14 wherein said light beam is reflected from said mirror a single time.

* * * * *